United States Patent [19]

Snowden et al.

[11] Patent Number: 5,010,330
[45] Date of Patent: Apr. 23, 1991

[54] PAGING SYSTEM EMPLOYING DESIGNATED FRAME COMMENCING INFORMATION SERVICE DATA MESSAGE TRANSMISSION

[75] Inventors: Gregory O. Snowden, Boca Raton; Clifford E. Barrett, III; Fernando Gomez, both of West Palm Beach, all of Fla.

[73] Assignee: Motorola, Inc., Schaumburg, Ill.

[21] Appl. No.: 456,423

[22] Filed: Dec. 26, 1989

[51] Int. Cl.$^5$ .............................................. H04B 7/00
[52] U.S. Cl. ........................... 340/825.21; 340/825.27; 340/825.44; 455/343
[58] Field of Search ........... 340/311.1, 825.44, 825.45, 340/825.46, 825.47, 825.48, 825.52, 825.26, 825.27, 825.21; 455/186, 343, 32, 38; 370/94.1

[56] References Cited

U.S. PATENT DOCUMENTS

| | | | |
|---|---|---|---|
| 4,383,257 | 5/1983 | Giallanza et al. | 340/825.44 |
| 4,677,434 | 6/1987 | Fascenda | 340/825.26 |
| 4,742,516 | 5/1988 | Yamaguchi | 370/94.1 |
| 4,860,003 | 8/1989 | DeLuca et al. | 340/825.48 |
| 4,922,221 | 5/1990 | Sato et al. | 340/311.1 |

FOREIGN PATENT DOCUMENTS 8809091 11/1988 World Int. Prop. O. ...... 340/825.27

Primary Examiner—Donald J. Yusko
Assistant Examiner—Dervis Magistre
Attorney, Agent, or Firm—William E. Koch; Vincent B. Ingrassia

[57] ABSTRACT

A paging system which provides both individual and information services includes a transmitter which transmits page call address and data periodically in batches to subscribing paging receivers. Each batch comprising a synchronization code followed by a predetermined plurality of sequential frames. Each paging receiver searches for both its individual service address and a first information service address in its corresponding assigned frame of each batch of a transmission period, and in response to reception of the first information service address, searches for a second information service address in a designated common frame of each batch of a transmission period. Individual and information service data messages are obtained from frames immediately subsequent the frame in which the respective individual and second information service addresses are found.

33 Claims, 11 Drawing Sheets

PAGING SYSTEM EMPLOYING DESIGNATED FRAME COMMENCING INFORMATION SERVICE DATA MESSAGE TRANSMISSION

REFERENCE TO RELATED APPLICATIONS

The following U.S. patent applications are being submitted to the U.S. Patent and Trademark Office concurrently with the instant application:

Ser. No 456,698, filed Dec. 26, 1989, by Snowden et al., and entitled "Paging System Employing Designated Batch Information Service Data Message Transmission"; and Ser. No. 456,894, filed Dec. 26, 1989, by Snowden et al., and entitled "Paging System Employing Designated Preamble Information Service Data Message Transmission", both being assigned to the same assignee as the instant application.

BACKGROUND OF THE INVENTION

This invention relates to paging systems which provide both individual and information services to subscribing paging receivers and, according to one aspect, to paging systems of the kind wherein a transmitter transmits page call address and data periodically in batches, each batch comprising a synchronization code word followed by a predetermined plurality of sequential frames; and wherein a battery saver paging receiver searches for both its individual service address and a first information service address in its corresponding assigned frame of each batch of a transmission period, and in response to reception of the first information service address, searches for a second information service address in a designated common frame of each batch of a transmission period. Individual and information service data messages are obtained from frames immediately subsequent the frame in which the respective individual and second information service addresses are found.

A typical system of the above kind is one employing the well-known POCSAG coding protocol in which each paging receiver of the system is assigned a frame of each batch to search for its individual service address or addresses. To alleviate frame crowding and render an efficient throughput, the frame assignments of the paging receivers of a paging system are uniformly distributed across the frames of each batch. It is also desirable to have these paging systems support information services of the kind where all users of paging receivers subscribing to the service can be automatically provided with information service data such as stock prices, sports results, weather reports, ... etc.

Accordingly, each paging receiver subscribing to an information service is typically programmed to respond to both an information service address and at least one individual service address. If the POCSAG method of frame assignment is used, i.e. for a given paging receiver, all addresses thereof are assigned to only one frame of a batch, all pagers must have both their individual and information service addresses in the same frame. Under these conditions, the paging system must transmit the information services data repeatedly for each frame of a batch in order to provide this data to all of the subscribing pagers. Since the information services data streams are generally long, retransmission for each frame of a batch results in a loss of valuable transmission air time which correlates directly to loss of profitability.

A solution to the aforedescribed drawback is to assign all paging receivers subscribing to both an information service and an individual service to a common frame of a batch, thereby requiring only one transmission of the information services data stream for each update and no retransmissions for other frames of the batch. This solution also results in a number of difficulties. First, when the number of information service paging receivers of a system is large, frame crowding of one frame of a batch occurs which creates system loading and throughput problems. Secondly, paging receivers currently in service may wish to add the information service capability which currently requires the inconvenience of changing the frame of their individual address to the common information service frame. This may also result in the pager being eliminated from a group call group which is confined to the original individual address frame. Alternatively, if the pager is forced to search for individual and group addresses in one frame and information service data in another frame of each batch, battery life of the paging receiver will be significantly degraded.

It is an object of the present invention to provide an improved paging system, transmitter, and paging receiver wherein the above disadvantages may be overcome or at least alleviated.

SUMMARY OF THE INVENTION

A system for selective radio communication includes a transmitter terminal operative to transmit call information periodically in transmission periods comprising a plurality of batches to a population of selectively addressable receivers. Each transmission batch commences with a predetermined synchronization code followed by a predetermined plurality of sequential frames which may include an individual selective call address of a receiver followed by an individual or group data message for the addressed receiver. Each receiver is assigned one frame of each transmission batch, and is operative to search for its individual selective call address in the assigned frame in each transmission batch and, when addressed, to receive the associated data message in subsequent frames.

In accordance with one aspect of the present invention, the transmitting terminal also transmits in a transmission period an information service call address, in each of the assigned frames of a subset of information service subscribing receivers of the population of receivers, and when the information service call address has been transmitted in all of the assigned frames of the receivers of the subset, the transmitting terminal transmits, in the same transmission period, an associated information service data message in frames subsequent the synchronization code of a designated batch. Each receiver of the subset is programmed to search each batch of a transmission period for the information service call address solely in its assigned frame and, when addressed by the information service call address, to receive the associated information service data message in frames subsequent the synchronization code of the designated batch of the same transmission period.

In another aspect of the present invention, the transmitting terminal transmits in a transmission period a first information service call address in each of the assigned frames of the subset of receivers, and when the first information service call address has been transmitted in all of the assigned frames of the receivers of the subset, it transmits, in the same transmission period, a second information service address in a frame common to all receivers of the subset followed by an associated information service data message in subsequent frames. Accordingly, each receiver of the subset is programmed to search for the first information service call address solely in its assigned frame of each transmission batch and, responsive to the reception to the first information service call address in the assigned frame, to search for the second information service call address solely in the common frame. Each receiver of the subset is further responsive to the reception of the second information service call address in the common frame to receive the associated information service data message in frames subsequent thereto.

In a still further aspect of the present invention, the transmitting terminal transmits in a transmission period an information service call address in each of the assigned frames of the subset of receivers followed by a data word representative of a subsequent frame in the transmission period commencing the transmission of an associated information service data message. Thereafter, the transmitting terminal transmits in the same transmission period the associated information service data message commencing at the frame represented by the corresponding data word. Accordingly, each receiver of the subset is programmed to search for the information service call address solely in its assigned frame of each transmission batch and is responsive to the reception of the information service call address in the assigned frame to receive the corresponding data word. Each receiver of the subset is further responsive to the reception of the information service call address to receive the associated information service data message commencing in the frame identified by the corresponding received data word.

In a still further aspect of the present invention, the transmitting terminal transmits in a transmission period an information service call address in each of the assigned frames of the subset of receivers and transmits in the same transmission period an associated information service data message commencing at a common frame for all receivers of the subset, the common frame occurring at a fixed differential time relative to each transmission of an information service call address in the transmission period. Accordingly, each receiver of the subset is programmed to search for the information service address solely in its assigned frame of each transmission batch and responsive to the reception of the information service call address in the assigned frame to delay for the corresponding fixed differential time relative to the information service call address reception frame of the corresponding receiver to receive the information service data message commencing at the common frame.

BRIEF DESCRIPTION OF THE DRAWINGS

One system for selective radio communication of information from a transmitter to a population of selectively addressable receivers will now be described, by way of example only, with reference to the accompanying drawings, in which.

DESCRIPTION OF THE PREFERRED EMBODIMENT

Figure 1:
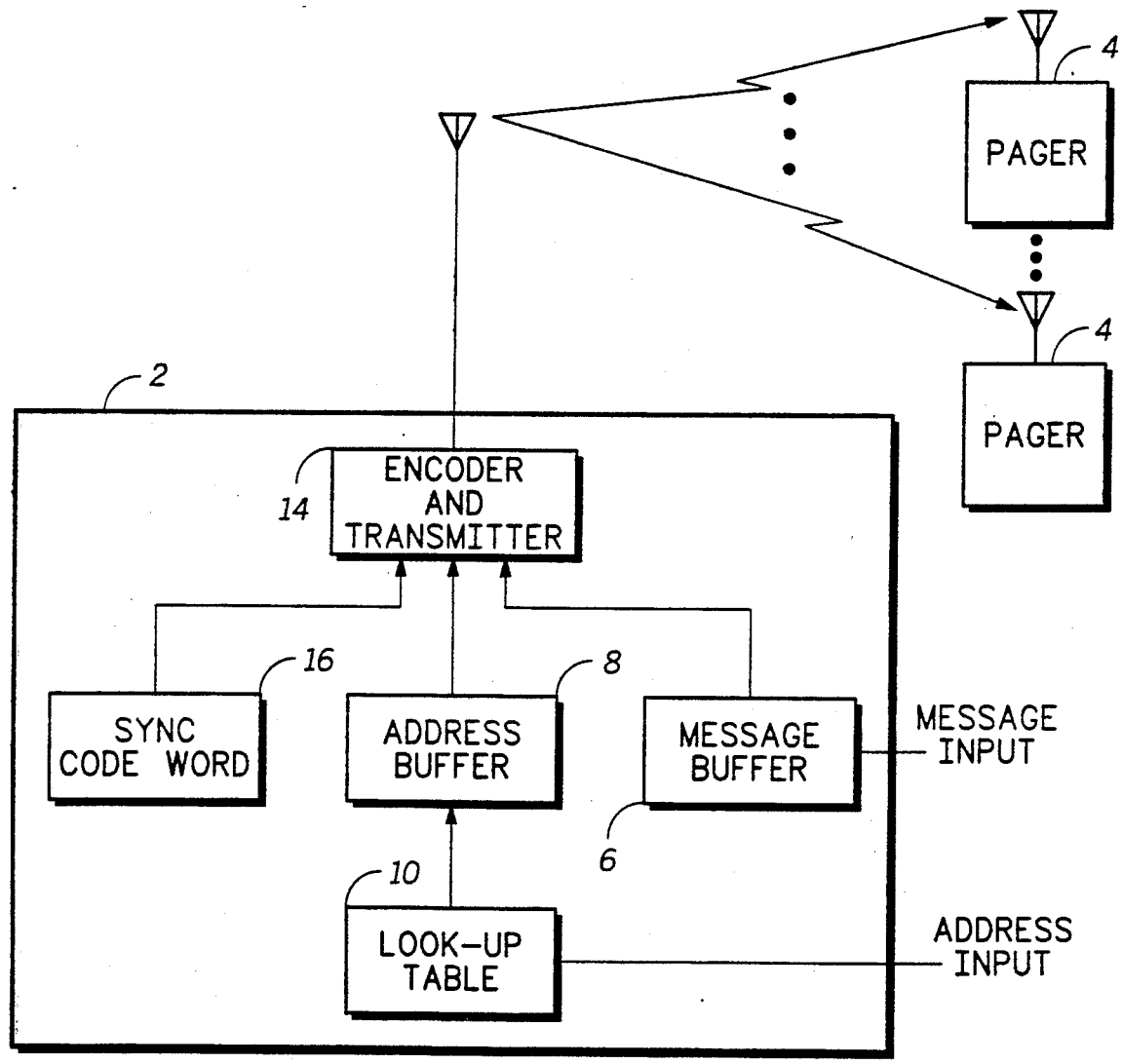
FIG. 1 is a block diagram schematic of a paging system including a transmitter and paging receivers suitable for embodying the principles of the present invention.

Referring firstly to FIG. 1, a paging system employing Post Office Code Standardization Advisory Group (POCSAG) coding protocol, for example, includes a fixed transmitter terminal 2 and a population of portable battery powered paging receivers 4.

The transmitter terminal 2 includes a buffer store 6 for holding an input message to be transmitted and a buffer store 8 for holding a call address of a paging receiver to which the message is to be transmitted. The transmitter terminal 2 also includes a look-up table 10 containing designated frame information for each paging receiver call address in the system. The transmitter terminal 2 also includes encoding and radio frequency (RF) transmission circuitry 14. Further included is a buffer memory 16 for storing the code of the sync word of the POCSAG protocol which is provided to the transmitter circuitry 14. Operation of the transmitter terminal 2 will be explained in greater detail hereinbelow.

Figure 2:
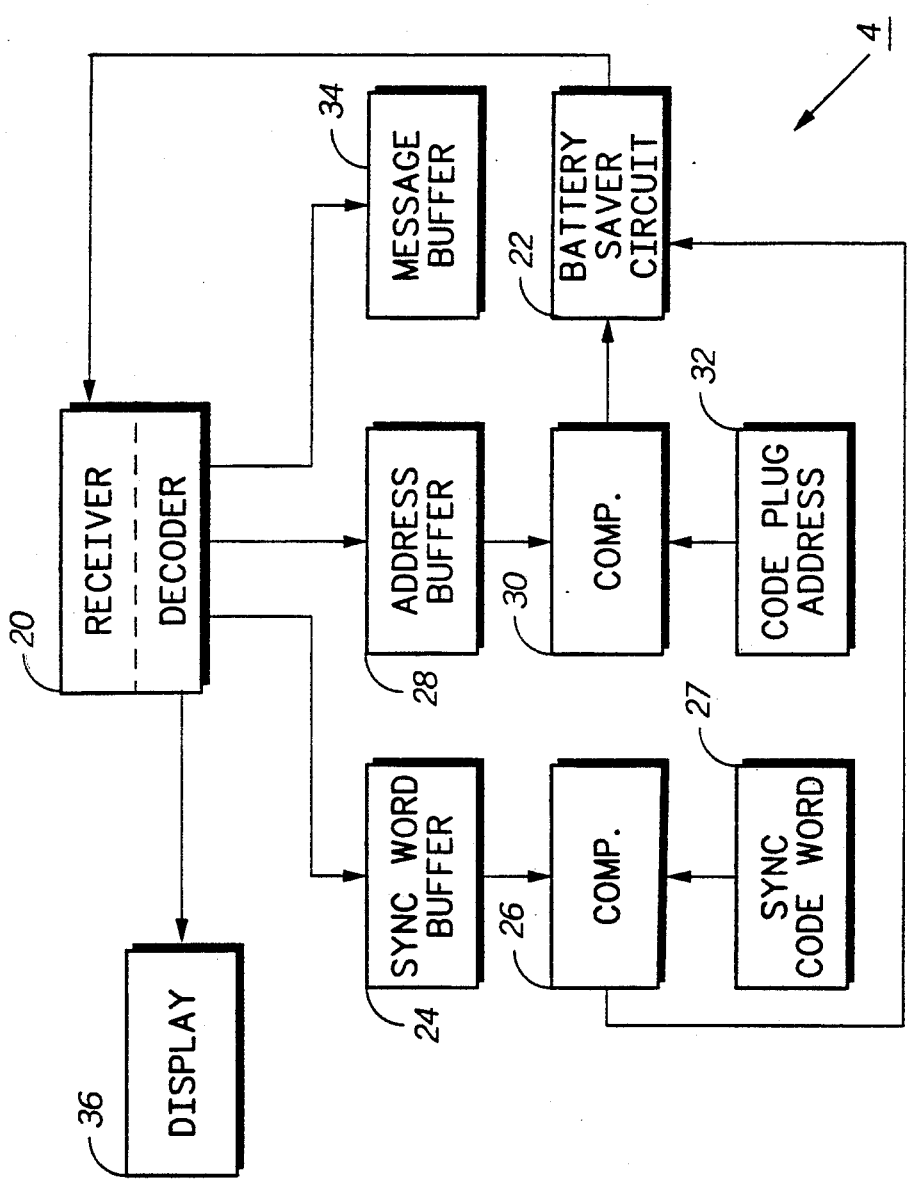
FIG. 2 is a functional block diagram schematic of a paging receiver suitable for use in the embodiment of FIG. 1.

Referring to FIG. 2, each receiver 4 includes RF circuitry 20 having receiving and decoding portions, the operation of which is controlled by a conventional battery saver circuit 22. Each receiver 4 also includes a buffer store 24 for holding a received synchronization code word, a comparator function 26 for comparing the received synchronization code word with a predetermined synchronization code word which may be stored in a memory 27, a buffer store 28 for holding a received call address or addresses, a comparator function 30 for comparing the received address or addresses with predetermined address(es) pre-programmed into the pager in a memory 32 and a buffer store 34 for holding received data message(s).

The transmitter terminal 2 may transmit data messages to receivers 4 in two modes: (i) by an individual or group call in which a data message is preceded by an individual selective call address, or (ii) by an information service call in which an information service data message is preceded by a call address associated with the information service for reception only by a subset of receivers of the system subscribing to the information service and programmed to process information service data messages in response to the information service's call address.

Figure 3:
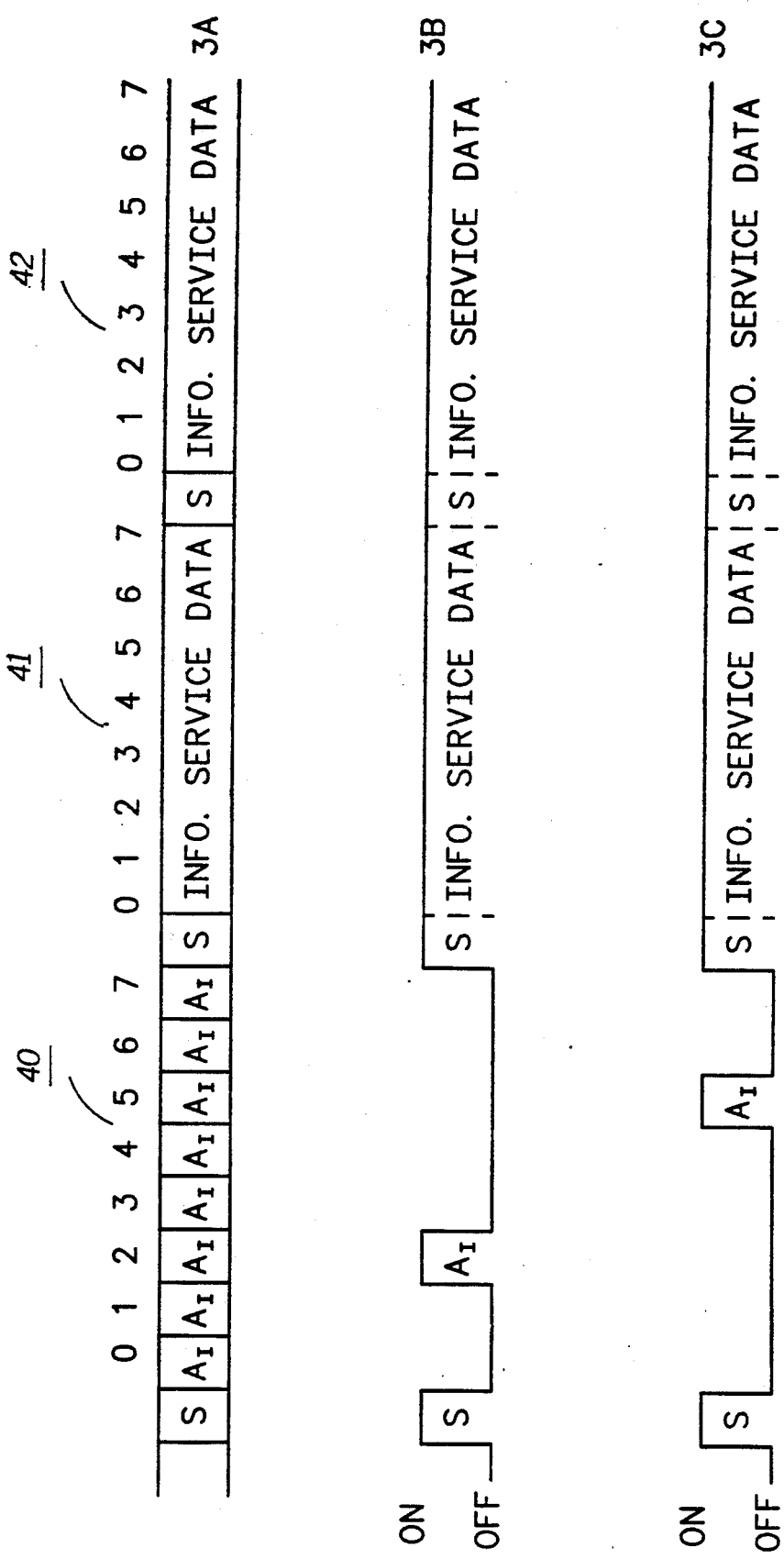
FIG. 3 includes time based representations A, B, and C of a plurality of batches of a transmission period illustrating one embodiment of signaling format and pager operation regarding individual and information service calls suitable for use in the embodiment of FIG. 1.

In the present embodiment, the paging system employs RF binary coded signaling which may be, for example, in the POCSAG code format as shown in illustration A of FIG. 3. Briefly, the POCSAG code format consists of at least a 576-bit preamble (not shown) followed by one or more batches of code words for each transmission period. Each batch is preceded by a 32-bit frame synchronization code word, denoted as S, and comprises eight (8) 64-bit address frames, denoted as 0–7, of two 32-bit selective call address, data words, or idle code words each. The frame synchronization code word S marks the commencement of each batch of code words. The POCSAG code is well known and will not be described in further detail. A fuller explanation of the code may be found in "Theory/Maintenance Manual", Reference 68P81047C95-0, available from Motorola Communications & Electronics, Inc., 1309 E. Algonquin Road, Schaumburg, Illinois 60196.

Presently, for each individual or group call message to be transmitted, the encoding and transmission circuitry 14 transmits, at the beginning of each transmission period, a preamble followed by the synchronization code word S. Each receiver of the population is assigned one frame of each transmission batch in which it expects to receive its call address. When transmitting a message to a receiver, the transmitter terminal 2 consults the address/frame information look-up table 10 to determine in which predetermined frame following the synchronization code word the intended receiver, whose address is held in store 8, expects its individual selective call address to be transmitted, and transmits the intended receiver's individual address in the subsequent frame determined by the look-up table information in dependence on the individual address of the intended receiver.

Following the frame containing the intended receiver's address, the transmitter terminal 2 may encode and transmit in such subsequent frames the data words of the associated individual or group message held in the store 6. After each eight frames have been transmitted, the synchronization code word S is periodically transmitted commencing the next batch of frames and the data message may continue into the frames of the next batch.

Further, for each information service call message to be transmitted which may be stored in the buffer 6, there is a corresponding information service call address $A_I$ stored in buffer 8 of the terminal 2. Accordingly, the encoding and transmission circuitry 14 of terminal 2 may be controlled to also transmit the information service call message information periodically during certain transmission periods to a subset of information service subscribing receivers of the system having receivers programmed to receive and process such information service call messages as will be described in greater detail hereinbelow.

In accordance with one aspect of the present invention as illustrated in the time based waveforms A, B, and C of FIG. 3, the transmitter terminal 2 is further operative to transmit in a transmission period an information service call address $A_I$ in each of the assigned frames of the receivers of the information serviCe subscribing subset. In the example shown by the illustration A of FIG. 3, it is assumed that the receivers of the subset have assigned frames distributed over all of the frames 0–7 of each transmission batch. In the present example, the transmitter terminal 2 transmits the information service call address $A_I$ to all of the receivers of the subset in one batch 40.

Accordingly, when the information service call address has been transmitted in all of the assigned frames of the receivers of the subset, the transmitter terminal 2 transmits, in the same transmission period, an associated information service data message in frames commencing subsequent the synchronization code word of a designated batch. In the present embodiment as shown by the illustration A of FIG. 3, the commencing batch of the transmission period is the next transmitted batch 41 after the information service call address $A_I$ has been transmitted in all of the assigned frames of the receivers of the subset.

Each receiver of the subset, according to the present invention, is programmed to search, upon recognition of the synchronization code word S of each batch of a transmission period, for the information service call address $A_I$ solely in its assigned frame and, when addressed by the information service call address $A_I$, to receive the associated information service data message in frames commencing subsequent the synchronization code word of the designated batch of the same transmission period. Illustrations B and C of FIG. 3 exemplify the operation of receivers of the subset having, for example, assigned frames 2 and 5, respectively.

Figure 4:
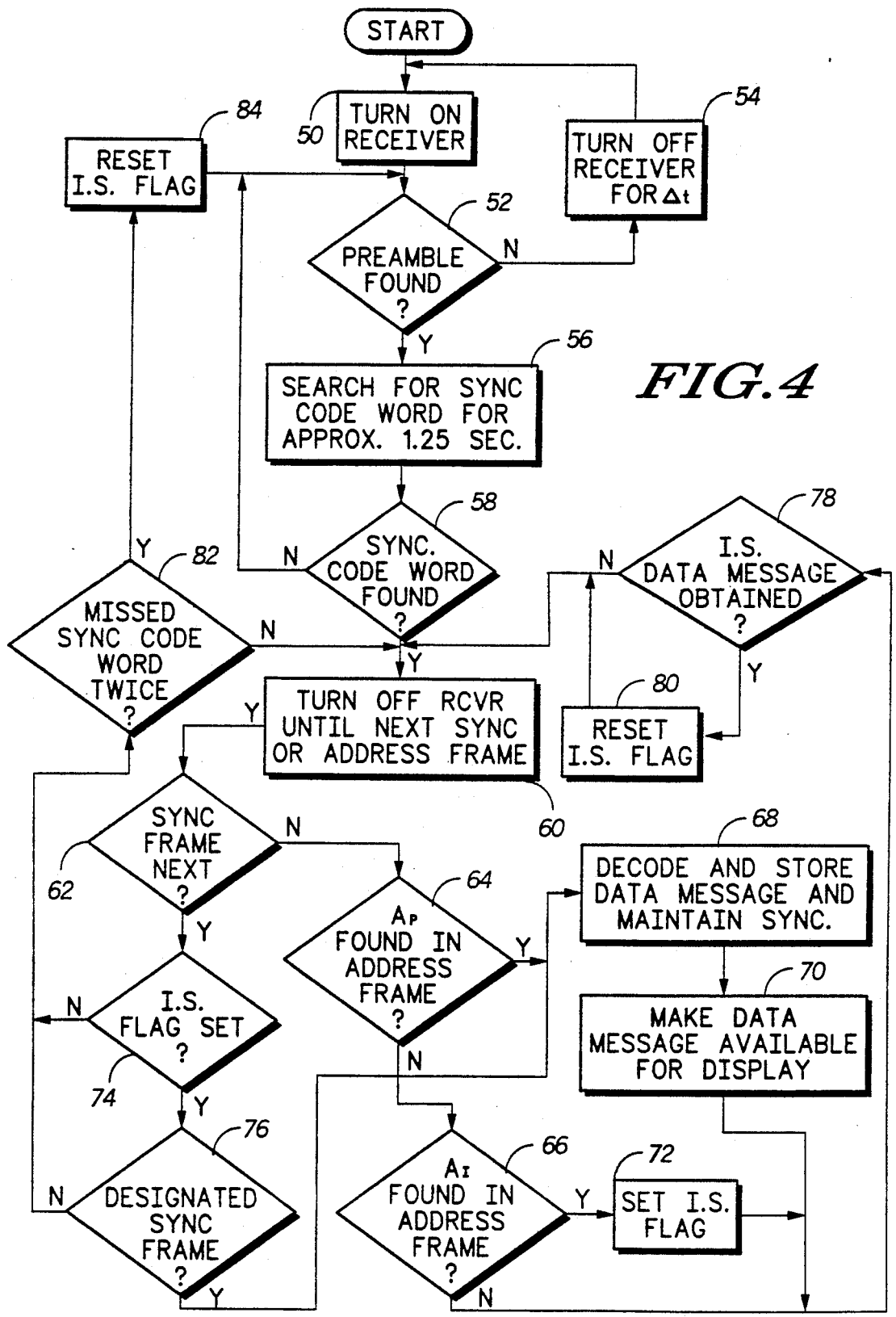
FIG. 4 depicts a flow chart illustrating paging receiver operations of the one embodiment suitable for use in the embodiment of FIG. 1.

The flow chart of FIG. 4 exemplifies the operations of a paging receiver of the subset in regard to the aspect of the present invention illustrated in FIG. 3. Referring to FIG. 4, the battery saver circuit 22 of each battery powered receiver 4 activates the RF receiving portion of the circuitry 20 for substantially 217 msec. every 1.047 seconds, for example, to determine if a preamble is being transmitted by the transmitter terminal 2. This is accomplished in the receiver operations by the blocks 50, 52, and 54. If the preamble is not decoded by the circuit 20 while the receiver portion thereof is activated by the battery saver circuit 22 as determined by the decisional block 52, the battery saver circuit 22 deactivates the receiver portion in the block 54 in order to extend battery life of the receiver. On the other hand, if the preamble is received and decoded during the activation period as determined by the decisional block 52, the receiver portion remains activated until a synchronization code word S has been received as determined by the blocks 56 and 58. The received synchronization code word may be held in the buffer 24 and compared with the predetermined synchronization code word stored in memory 27 of the receiver 4. If the synchronization code word is not found in the received transmission within a predetermined interval of time, say 1.25 seconds, for example, then the receiver once again is governed to search for the preamble utilizing the blocks 50, 52, and 54.

If the synchronization code word S is found by block 58, then the battery saver circuitry 22 is governed by deactivate the circuitry 20 until the next sync frame or the assigned address frame by block 60. An example of this operation is shown by the illustrations B and C of FIG. 3. Continuing, if the assigned address frame is expected next as determined by the decisional block 62, the transmitted information for the assigned frame is decoded by the circuit 20 and stored in the address buffer 28. Using the comparator 30, the received address code of buffer 28 may be compared with the individual and information service address codes of the receiver which may be stored in and accessed from the code plug address memory 32. These operations are exemplified by the decisional blocks 64 and 66. If there is a match of the individual address code, the transmitted information in the immediately subsequent frames are decoded and stored in the message buffer 34 while maintaining synchronization by block 68. Thereafter, the obtained individual or group data message is made available for display in block 70 and the receiver operation is returned to step 60 wherein the circuitry 20 is deactivated by the battery saver circuit 22 until the next sync or assigned address frame.

In the event that an information service call address $A_I$ is found in the assigned address frame as determined by the decisional block 66, an information service (I.S.) flag is set by the block 72 and the receiver operation is returned to the block 60 via decisional block 78 which is described herebelow. Of course, if neither the individual nor the information service call address is found in the assigned address frame, the receiver operation is returned to block 60 also through block 78.

Given the circumstances that an information service call address is found in the assigned frame of a receiver as exemplified by the illustrations B and C of FIG. 3, the receiver operation is returned to block 60, and then upon reception of the next sync frame as determined by the decisional block 62, block 74 determines if the I.S. flag is set. Under the present conditions, the I.S. flag is set, and the receiver next determines if the present sync frame is the designated sync frame utilizing decisional block 76. If the resulting decision of block 76 is positive, the receiver operation continues at blocks 68 and 70 governing the circuitry 20 to decode and store the information service data message in the message buffer 34 and make it available for display. Upon exiting either block 70, block 72, or the negative decision of block 66, it is determined in the decisional block 78 if the information service data message was obtained, and if so, the I.S. flag is reset in block 80 and the receiver operation is returned to block 60.

In the course of a transmission period, the receiver is turned on for synchronization during each sync frame and in the event that the I.S. flag is not set or the particular sync frame is not the designated one as determined by the decisional blocks 74 and 76, respectively, the receiver operation is continued at the decisional block 82 wherein it is determined whether or not the receiver missed the synchronization code word twice. If not, the receiver operation is returned to block 60. On the other hand, if the receiver has missed the synchronization code word twice, the I.S. flag is reset by the block 84 and the receiver is governed to search for a new preamble utilizing the blocks 50, 52, and 54 as described above.

In accordance with another aspect of the present invention, the transmitter terminal 2 may transmit in a transmission period a first information service call address A1 in each of the assigned frames of the subset of receivers and, when the first information service call address has been transmitted in all of the assigned frames of the receivers of the subset, the transmitter terminal 2 may transmit a second information service call address A2 in a subsequent frame of the same transmission period which frame being common to all the receivers of the subset followed by an associated information service data message in subsequent frames. This aspect of the present invention is exemplified in illustration A of FIG. 5 in which the first information service call address A1 is transmitted in all of the assigned frames of the subset receivers over batches 90 and 91, and the second information service call address is transmitted in frame 3 which, for the present example, is the frame common to all the receivers of the subset. In the immediate subsequent frames to frame 3 of batch 92 is transmitted the associated information service data message.

Figure 5:
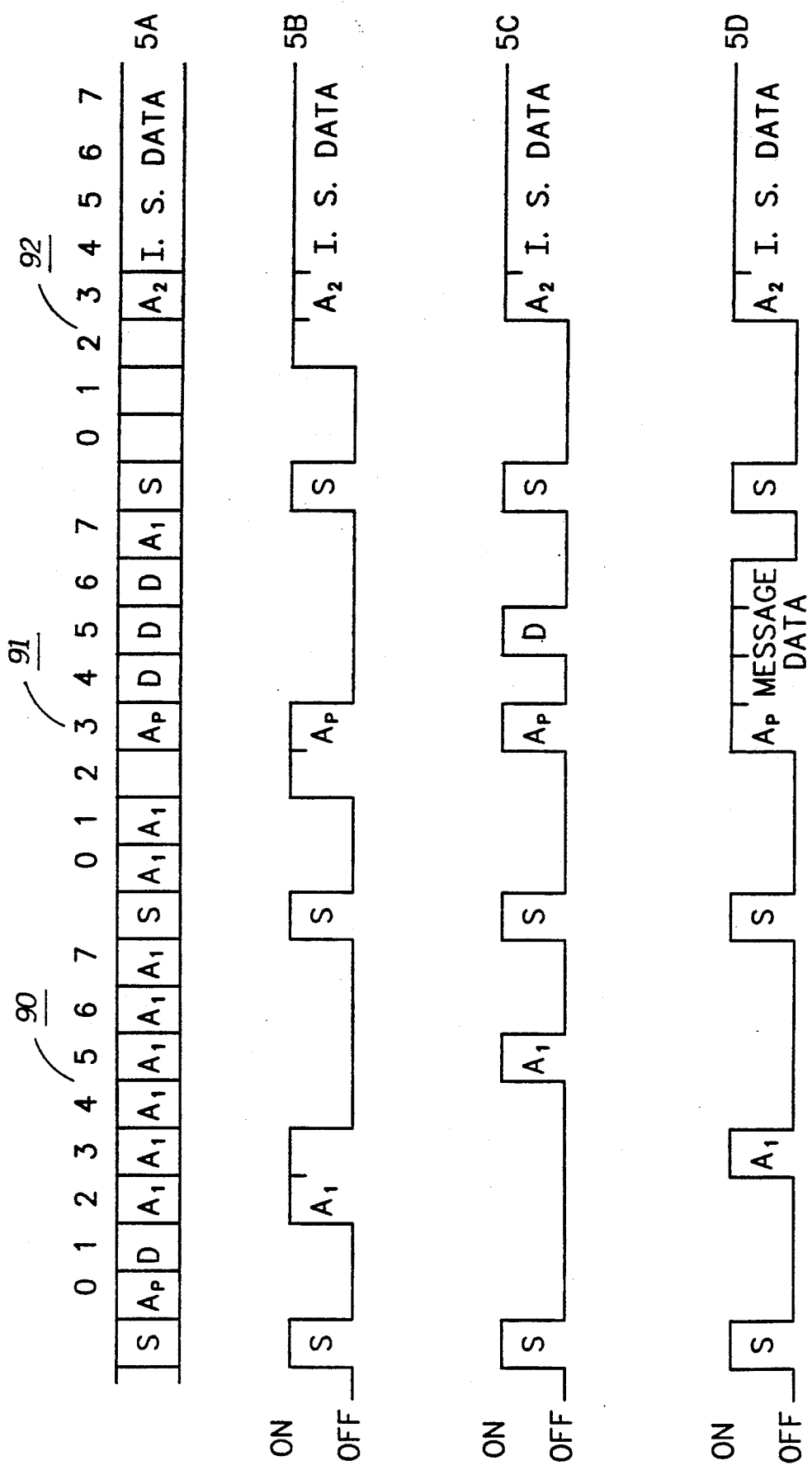
FIG. 5 includes time based representations A, B, C, and D illustrating an alternate embodiment of signaling format and paging receiver operations regarding individual and information service transmissions suitable for use in the embodiment of FIG. 1.

Further as exemplified by the illustrations B, C, and D of FIG. 5, each receiver of the subset, in accordance with the present aspect, is programmed to search for the first information service call address A1 solely in its assigned frame of each transmission batch. The receivers of illustrations B, C, and D of FIG. 5 have assigned frames 2, 5, and 3, respectively, of each transmission batch. The receivers of the subset are responsive to the reception of the first information service call address A1 in their assigned frame to search for the second information service call address A2 solely in the common frame which, in the present example, is frame 3. Each receiver of the subset is further responsive to the reception of the second information service call address A2 in the common frame to receive the associated information service data message in frames subsequent thereto as exemplified by that occurring in batch 92 of FIG. 5.

Figure 6A:
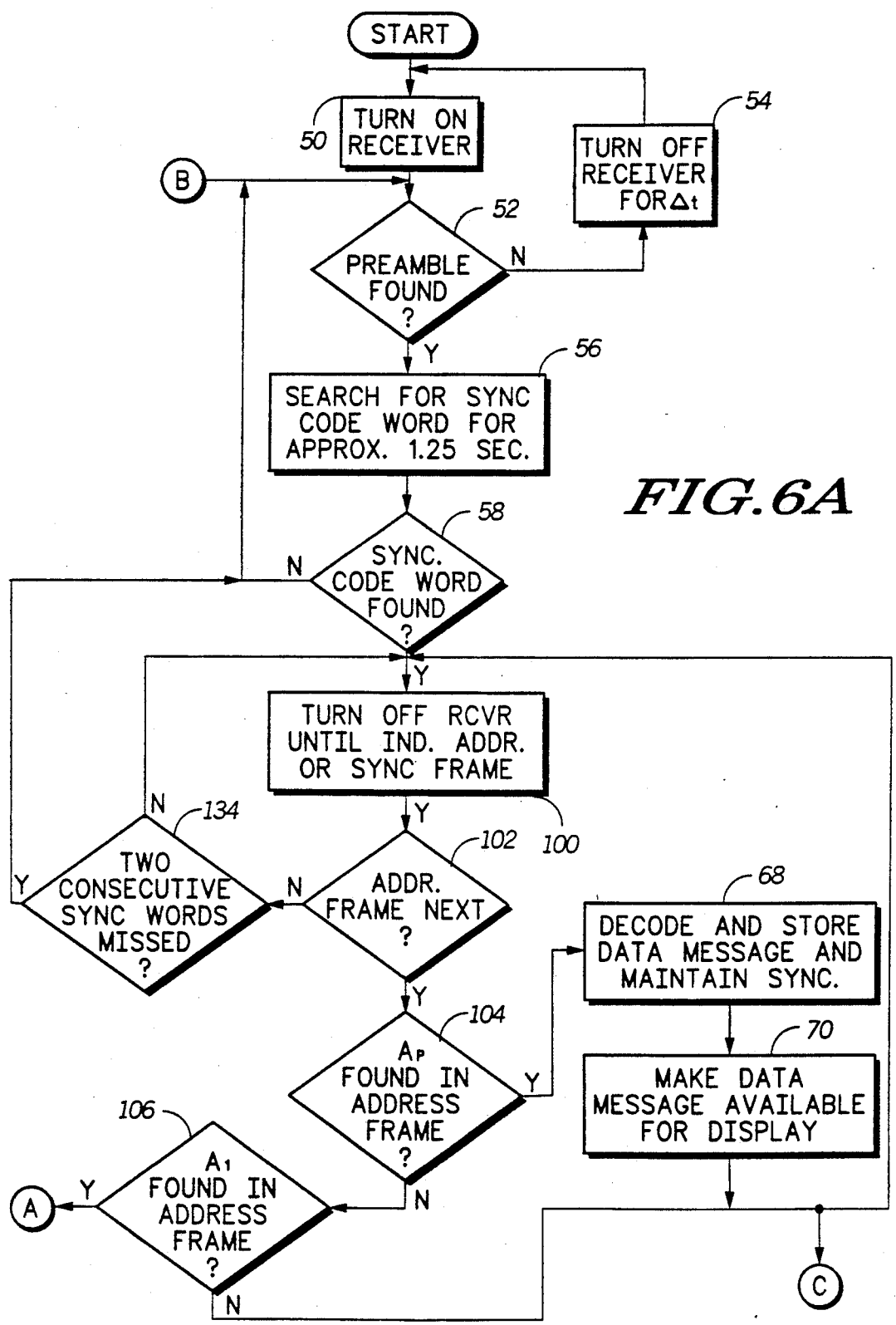
FIGS. 6A through 6E depict flow charts illustrating paging receiver operations based on the alternate embodiment suitable for use in the embodiment of FIG. 1.
Figure 6B:
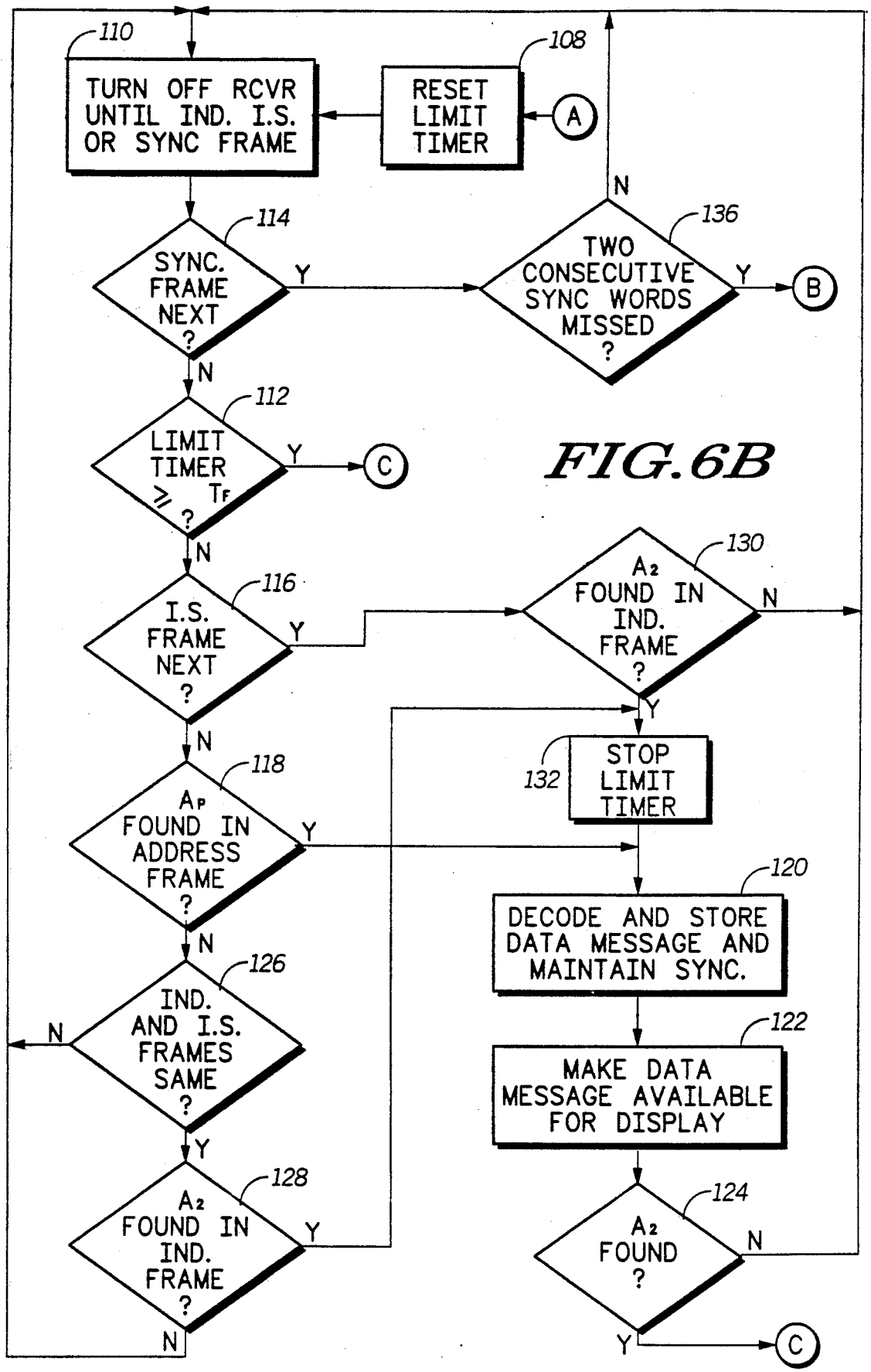

The flow charts of FIGS. 6A and 6B compositely exemplify the operation of the receiver of a subset in connection with one embodiment of the present aspect of the invention. Referring to FIG. 6A, similar operational blocks 50-58 as that described in connection with the flow chart of FIG. 4 may be used for the present aspect in connection with identifying a transmission period and locating the initial synchronization code word thereof. Once the initial synchronization code word is found as determined by the decisional block 58 in connection with the circuits 24, 26, and 27 of receiver 4, the receiver operation continues at block 100 in which the circuit 20 is deactivated by the battery saver circuit 22 until the next assigned individual address frame or synchronization frame occurs. If the assigned individual address frame occurs next as determined by the decisional block 102, then the receiver receives and decodes the data of that frame and determines whether or not it matches the individual AP or first information service A1 addresses as determined by the decisional blocks 104 and 106 in connection with the circuits 28, 30, and 32 of a receiver 4. In the event that neither address AP nor A1 is found in the assigned individual address frame of the receiver, the receiver operation continues at block 100.

In accordance with the example of illustrations B, C, and D of FIG. 5, the address A1 is found in each of the assigned frames of their respective receiver, i.e. frames 2, 5, and 3, respectively. In response to this event, receiver operation continues at block 108 of FIG. 6B in which a limit timer is reset and started counting. Thereafter, in block 110, the receiver circuit 20 is deactivated until the occurrence of either the assigned individual address frame, the common information service frame, or a sync frame in the same transmission period. In this embodiment, the transmitter terminal 2 is operative to transmit the second information service call address A2 in a common frame within a fixed time interval referenced to each transmission of the first information service call address A1 and a receiver of the subset is precluded from searching for the second information service call address A2 in the subsequent common frame if it is not received within the fixed time interval TF from the reception of the associated first information service call address A1 by the corresponding receiver.

In the embodiment exemplified by the flow chart of FIG. 6B, the receiver determines whether or not it has exceeded the fixed time interval TF each time it executes the operation of the decisional block 112. That is, if the fixed time interval is exceeded before the reception of the second information service call address A2 in the common frame, then the receiver operation regarding the searching for the call address A2 is circumvented and returned to block 100. Thereafter, the receiver must first receive another call address A1 in the assigned address frame before it may again search for the call address A2 in the common address frame.

The search for the call address A2 in the common address frame is exemplified by the portion of the flow chart depicted in FIG. 6B. Referring to FIG. 6B, subsequent to block 110, decisions are made by the operations of block 114 and 116 to determine which frame occurs next. If the assigned individual address frame occurs next, then the receiver operation flows through decisional blocks 114, 112, and 116 to the decisional block 118 which determines whether or not the individual address $A_P$ of the receiver is found in its assigned frame.

In the event that the individual address $A_p$ is found in the assigned frame as exemplified in batch 91 of illustration D of FIG. 5, then the message data in subsequent frames 4, 5, and 6 is decoded and stored in the message buffer 34 and made available for display by the blocks 120 and 122. Under the current conditions, since the call address has not been received, the decisional block 124 diverts the program execution back to block 110 to repeat the process. Note that the receivers exemplified by the illustrations B, C, and D are searching in batch 91 in both their assigned individual address frame and the information service common frame.

For the case in which the assigned individual address and common frames are the same as exemplified by illustration D, then the receiver will search the same frame for both the individual call address $A_P$ and the information service Call address A2. In the present embodiment, this is accomplished utilizing the decisional blocks 126 and 128 depicted in the flow chart of FIG. 6B.

Continuing, for the present example, the call address A2 is transmitted within the fixed time interval $T_F$ in the common frame, frame 3, of batch 92 as exemplified by the illustrations in FIG. 5. The receiver may detect the reception of the call address A2 either by the decisional block 128 or the decisional block 130, as the case may be, and thereafter stop the limit timer in block 132. Next, the information service data message commencing at frame 4 in batch 92 is decoded and stored while maintaining synchronization in block 120 and made available for display by the operation of block 122. In decisional block 124, it is determined that the call address A2 was found, which causes the receiver operation to be diverted back to block 100 thereby precluding further searching for the second information service call address A2 exemplified by the flow chart of FIG. 6B.

In addition, for the cases in which two consecutive synchronization codes words are missed by the receiver 4 as determined by the decisional block 134 in the flow chart of FIG. 6A or decisional block 136 in the flow chart of FIG. 6B, the receiver operation is diverted to again searching for the preamble of another transmission period utilizing the blocks 50, 52, and 54.

In another embodiment of the present aspect of the invention, the transmitter terminal 2 is operative to transmit the second information service call address A2 in a common frame within a predetermined number of synchronization code words referenced to each transmission of the first information service call address, and a receiver of the subset is precluded from searching for the second information service call address A2 in the common frame if it is not received within the predetermined number of synchronization code words from reception of the associated first information service call address A1 by the corresponding receiver. The flow chart of FIG. 6C, in connection with the flow chart of FIG. 6A, exemplify receiver operation in connection with this embodiment.

Figure 6C:
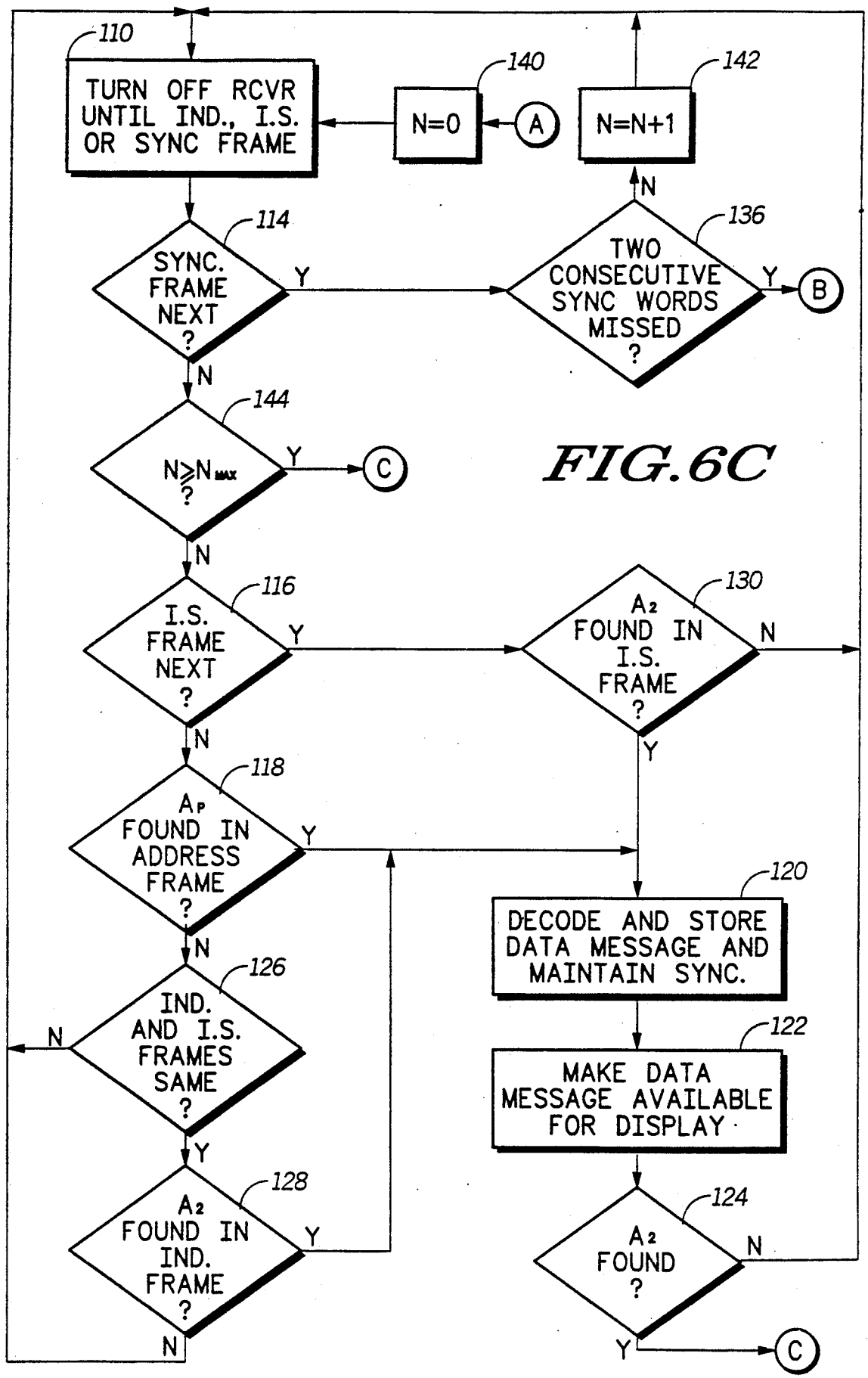

As shown in FIG. 6C, upon entering the mode for searching for the call address A2 in the common frame, an index N is set to zero in block 140. Then, upon receiving each synchronization code word subsequent to the reception of the call address A1, the index is incremented by block 142 to count number of occurring synchronization code words. Accordingly, prior to searching the common frame for the call address A2, it is determined if the accumulated number of synchronization code words represented by the index N has exceeded the allowable number, denoted as NMAX, utilizing the decisional block 144. If the index N exceeds NMAX before receiving the call address A2 in the common frame, the receiver operation is diverted back to block 100 of the flow chart of FIG. 6A and the searching therefor is discontinued. The remainder of the operational blocks of FIGS. 6A and 6C are the same as those described in connection with FIGS. 6A and 6B supra.

In still another embodiment of this aspect of the invention, the transmitter terminal 2 is operative to transmit a data word representative of a variable time interval $T_v$ in at least one frame subsequent each transmission frame of the first information service call address A1, and each receiver of the subset is responsive to the reception of the call address A1 to receive the variable time interval data word $T_v$. For example, in the illustration C of FIG. 5, after the receiver receives the call address A1 in its assigned frame 5 of batch 90, it may remain activated to receive another data word in frame 6 which data word represents the variable time interval $T_v$. Thereafter, the receiver is precluded from searching for the second information service call address A2 in the common frame, which is frame 3 in the present example, if it is not received within the variable time interval of the data word corresponding to the associated call address A1 from the reception thereof by the corresponding receiver.

Figure 6D:
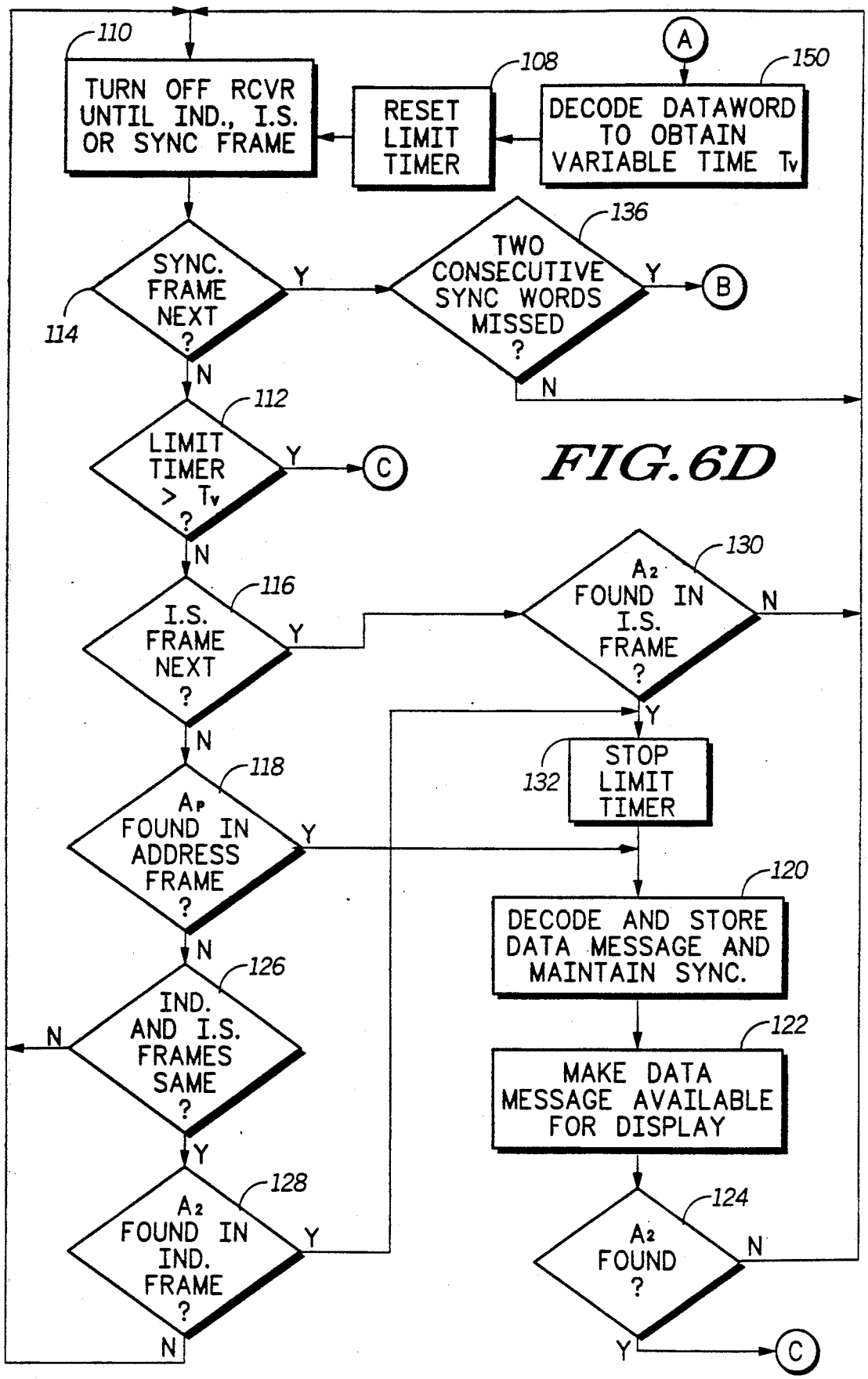

Receiver operation in connection with this embodiment is exemplified in the flow chart of FIG. 6D taken compositely with the flow chart of FIG. 6A. Referring to FIG. 6D, upon entering the mode for searching for the second information service call address A2 in the common frame, an operational block 150 governs the receiver to decode the associated data word received in the subsequent frame to obtain the variable time $T_v$. Thereafter, the limit timer is reset and restarted in block 108. Similar to that described in connection with the flow chart of FIG. 6B, the limit timer is compared with the variable time $T_v$ in the decisional block 112, and if it exceeds the time $T_v$, the remaining operations are circumvented and the receiver operation is diverted back to the operational block 100. Accordingly, no further searching for the call address A2 in the common frame shall occur until the call address A1 is again found in the assigned frame as determined by the decisional block 106. The remaining operational blocks of FIG. 6D exemplify the receiver operation in a similar manner as that described in connection with the flow chart of FIG. 6B.

In connection with still another aspect of the present invention, the transmitter terminal 2 is further operative to transmit in a transmission period an information service call address in each of the assigned frames of the subset of receivers with each such address transmission followed by a data word, representative of a subsequent frame in the transmission period commencing the transmission of an associated information service data message and to transmit the associated information service data message commencing at the frame represented by the corresponding data word.

For example, referring to the illustration C of FIG. 5, the data word representative of a subsequent frame may be transmitted in frame 6 of batch 90 and contain the information that the associated information service data message will commence at frame 4 of batch 92. Accordingly, each receiver of the subset is programmed to search for the call address A1 solely in its assigned frame of each transmission batch and be responsive to the reception thereof to receive the corresponding data word. Each such receiver is further responsive to the reception of the call address A1 to receive the associated information service data message commencing in the frame identified by the corresponding received data word.

Figure 6E:
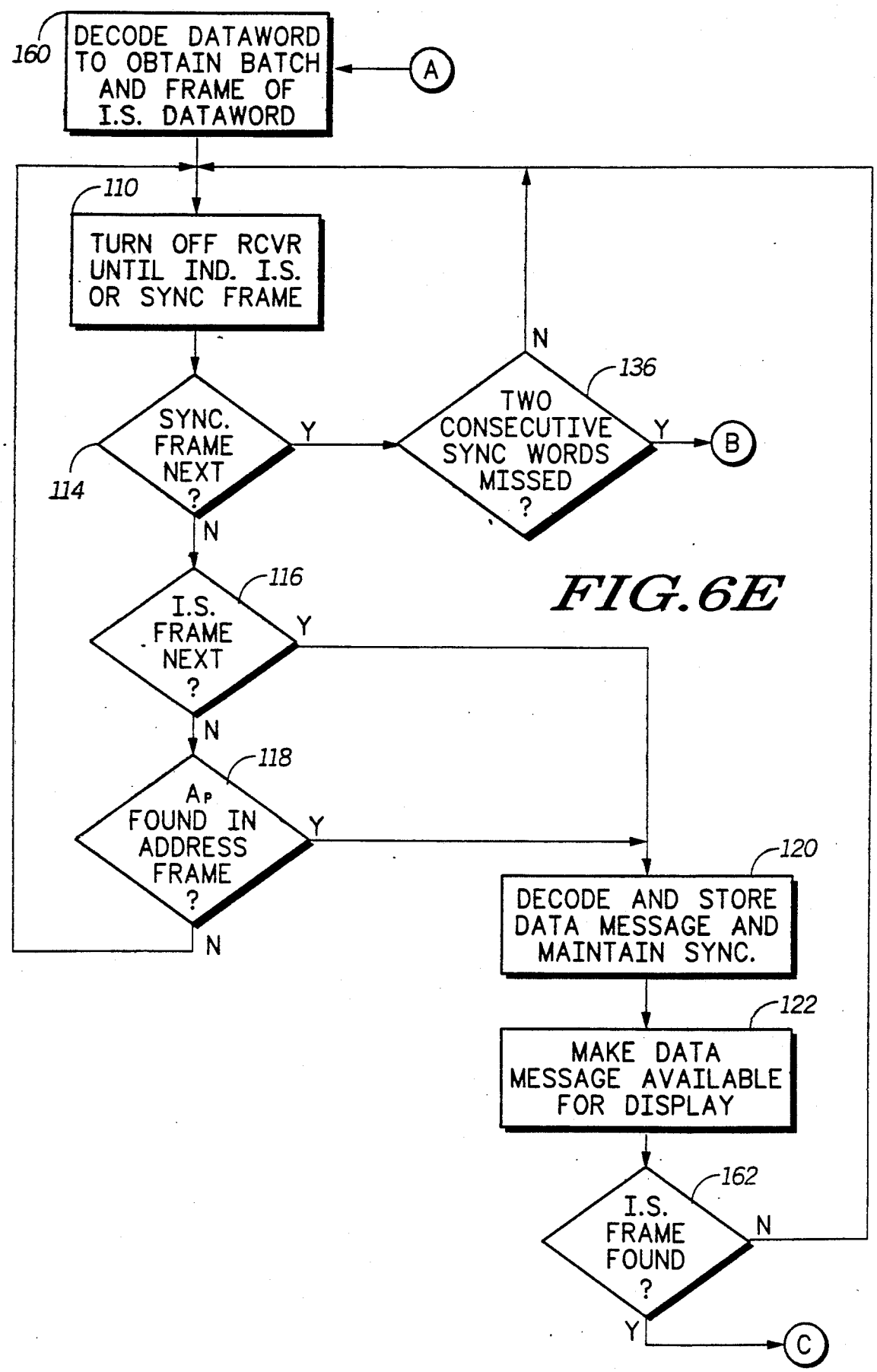

The flow chart of FIG. 6E, taken in conjunction with the flow chart of FIG. 6A, exemplifies receiver operation in connection with this embodiment. Referring to FIG. 6E, after finding the call address A1 in the assigned frame of the transmission batch (block 106), the receiver next decodes the corresponding data word associated therewith to obtain the batch and frame commencing the transmission of the information service data message in accordance with the operational block 160. In the decisional block 116, the receiver determines whether or not it is at the designated batch and frame to begin receiving the corresponding information service data message. In time, when the designated frame is reached, the associated data message is decoded and stored by the receiver while maintaining synchronization by the operations of block 120 and made available for display by the operations of block 122. Thereafter, operational flow is diverted back to block 100 of the mode described in connection with the flow chart of FIG. 6A by the decisional block 162.

In yet another aspect of the present invention, the transmitter terminal, after transmitting the information service call address in each of the assigned frames of the subset of receivers, may transmit the associated information service data message commencing at a common frame for all of the receivers, the common frame occurring at a fixed differential time relative to each transmission of an information service call address in the transmission period. Accordingly, each receiver of the subset is programmed to search for the information service call address solely in its assigned frame of each transmission period and be responsive to the reception thereof to delay for its corresponding fixed differential time relative to the information service call address reception frame to receive the information service data message commencing at the common frame.

For example, in illustration C of FIG. 5, the corresponding receiver, upon receiving the information service call address A1 at frame 5 of batch 90, would be programmed to delay its correspondingly fixed differential time taking it to frame 4 of batch 92 at which time it commences receiving the information service data message.

In still another aspect of the present invention, the paging system may include another receiving means disposed remotely from the transmitter terminal to receive the transmitted call information thereof in a similar manner as that of the subset of receivers and to further determine the event of a transmission period when the information service call address has been transmitted in all of the assigned frames of the receivers of the subset and for alerting the transmitter terminal of the event.

Figure 7:
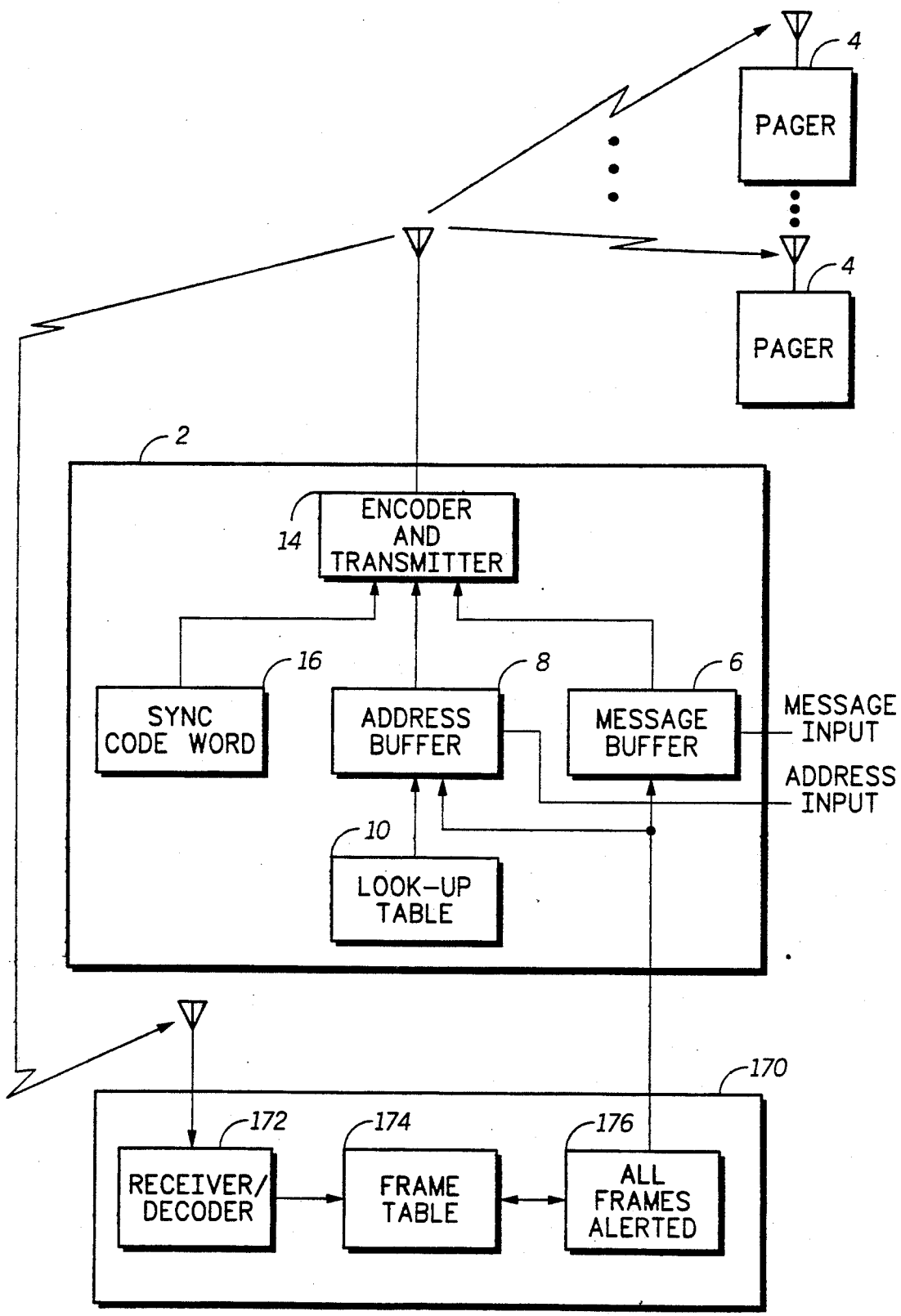
FIG. 7 is a block diagram schematic of an alternate embodiment of a paging system suitable for embodying another aspect of the present invention.

The functional block diagram schematic of FIG. 7 depicts an exemplified embodiment of this aspect of the invention. An additional receiver 170 includes a conventional receiver decoder 172 which operates to continuously receive call information in all frames of a transmission batch and searches for reception of the information service call address in such frames. The memory 174 may include registers corresponding to the assigned frames of the receivers of the subset. Accordingly, the registers of memory 174 may be set by the decoder 172 each time an information service call address is received in a corresponding assigned frame in a transmission period. Another circuit 176 of the receiver 70 may monitor the registers of the memory 174 and determine the event when all such registers have been set. In response to such event, the circuit 176 may alert the message buffer 6 and address buffer 8 of the transmitter terminal 2 to transmit commencing at the appropriate frame in the transmission period the information service data message or a combination of the call address A2 followed by the information service data message, as the case may be.

It will be appreciated that in a practical embodiment, the operations described in connection with the terminal 2, like the step of consulting a look-up table, for example, may be conveniently performed in software executed by a microprocessor system which may be a part of the encoder circuit 14. Similarly, the operations of the receivers 4 and 170, including the steps of detecting the predetermined synchronization code word S and detecting the information service call addresses AI, A1, or A2 and the individual address AP may also be carried out in software executed by a microprocessor system which may be part of the decoder circuit 20. It will also be appreciated that a single store may be used in the receiver for storing a received synchronization code word and a received call address since these parameters are received sequentially and will not interfere with one another. For a more detailed description of a suitable receiver and transmitter terminal, reference is made to the U.S. Pat. Nos. 4,518,961, entitled "Universal Paging Device with Power Conservation", issued May 5, 1985 to Davis et al. and 4,427,980, entitled "Encoder for Transmitted Message Activation Code", issued Jan. 24, 1984 to Fennell et al., both assigned to the same assignee as the instant application and both references being incorporated by reference herein.

It will be realized that compared with a conventional POCSAG system, the information service address(es) and the individual address of a particular receiver are not constrained to occur in the same frame, thus eliminating frame crowding and throughput problems which could otherwise occur.

While the present invention has been described based on the embodiments depicted in FIGS. 1-7 of the instant application, it is also understood by all those skilled in the pertinent art that modifications, additions, and deletions may be made thereto without deviating from the principles thereof. Accordingly, the present invention should not be limited to any single embodiment, but rather construed in breadth and scope in accordance with the recitation of the appended claims.

What is claimed is:

1. A system for selective radio communication of call information from a transmitting terminal to a population of selectively addressable receivers, said transmitting terminal being operative to transmit said information periodically in transmission periods comprising a plurality of batches, each batch commencing with a predetermined synchronization code followed by a predetermined plurality of sequential frames which may include an individual selective call address of a receiver followed by an individual or group data message for said addressed receiver, each receiver being assigned one frame of each transmission batch, and operative to search for its individual selective call address in said assigned frame in each transmission batch and, when addressed, to receive the associated data message in subsequent frames, said system comprising:

a subset of information service subscribing receivers of said population of receivers;

said transmitting terminal for also transmitting in at least one batch of a transmission period an information service call address in each of the assigned frames of said subset of receivers, and, when said information service call address has been transmitted in all of the assigned frames of said receivers of said subset, for transmitting, in the same transmission period, an associated information service data message in frames subsequent the synchronization code of a designated batch subsequent said at least one batch; and each said receiver of said subset being programmed to search each batch of a transmission period, for said information service call address solely in its assigned frame and, when addressed by said information service call address, to receive the associated information service data message in frames subsequent the synchronization code of said designated subsequent batch of the same transmission period.

2. The system according to claim 1 including means for receiving call information transmitted from the transmitting terminal to determine the event of a transmission period when the information service call address has been transmitted in all of the assigned frames of the receivers of the subset and for alerting the transmitting terminal of said event.

3. The system according to claim 2 wherein said receiving means is disposed remotely from the transmitting terminal to receive the transmitted call information thereof in a similar manner as that of the subset of receivers.

4. The system according to claim 1 wherein the transmitting terminal is operative to transmit an information service call address in each of the assigned frames of said subset of receivers in a single batch of a transmission period.

5. The system according to claim 1 wherein the designated batch of a transmission period is the next transmitted batch after said information service call address has been transmitted in all of the assigned frames of the receivers of said subset.

6. The system according to claim 1 using POCSAG coding.

7. A transmitting terminal for use in a system for selective radio communication of call information to a population of selectively addressable receivers, said transmitting terminal being operative to transmit said information periodically in transmission periods comprising a plurality of batches, each batch commencing with a predetermined synchronization code followed by a predetermined plurality of sequential frames which may include an individual selective call address of a receiver followed by an individual or group data message for said addressed receiver, each receiver being assigned one frame of each transmission batch, said transmitting terminal comprising:

first means for transmitting in at least one batch of a transmission period an information service call address in each of the assigned frames of a subset of information service subscribing receivers of said population; and second means for transmitting, in the same transmission period, one said information service call address has been transmitted in all of the assigned frames of said receiver of said subset, an associated information service data message in frames subsequent the synchronization code of a designated batch subsequent said at least one batch.

8. The transmitting terminal according to claim 7 wherein the first transmitting means is operative to transmit an information service call address in each of the assigned frames of said subset of receivers in a single batch of a transmission period.

9. The transmitting terminal according to claim 7 wherein the designated batch of a transmission period is the next transmitted batch after said information service address has been transmitted in all of the assigned frames of the receivers of said subset.

10. The transmitting terminal according to claim 7 using POCSAG coding.

11. A receiver for use in a system for selective radio communication of call information from a transmitting terminal to a population of selectively addressable receivers, said transmitting terminal being operative to transmit said information periodically in transmission periods comprising a plurality of batches, each commencing with a predetermined synchronization code followed by a predetermined plurality of sequential frames which may include an individual selective call address of a receiver followed by an individual or group data message for said addressed receiver, each receiver being assigned one frame of each transmission batch, said transmitting terminal further operative to transmit in at least one batch of a transmission period an information service call address in each of the assigned frames of a subset of information service subscribing receivers of said population, and when said information service call address has been transmitted in all of the assigned frames of said receivers of said subset, to transmit an associated information service data message in frames subsequent the synchronization code of a designated batch subsequent said at least one batch of the transmission period, said receiver operative to search for its individual selective call address solely in said assigned frame in each transmission batch and, when addressed thereby, to receive the associated data message in subsequent frames, said receiver comprising:

first means programmably set to enable said receiver to search for the information service call address solely in the assigned frame of each transmission batch; and second means responsive to the reception of the information service call address in said assigned frame to receive the associated information service data message in frames subsequent the synchronization code of said designated batch of the same transmission period.

12. The receiver according to claim 11 wherein said second means is programmably set to receive the information service data message commencing in the frame immediately following the synchronization code of the designated batch.

13. The receiver according to claim 11 wherein the second means is programmably set to respond to the designated batch of the plurality of batches of a transmission period upon being addressed by the information service call address.

14. A system for selective radio communication of call information from a transmitting terminal to a population of selectively addressable receivers, said transmitting terminal being operative to transmit said information periodically in transmission periods comprising a plurality of batches, each batch commencing with a predetermined synchronization code followed by a predetermined plurality of sequential frames which may include an individual selective call address of a receiver followed by an individual or group data message for said addressed receiver, each receiver being assigned one frame of each transmission batch, and operative to search for its individual selective call address in said assigned frame in each transmission batch and, when addressed, to receive the associated data message in subsequent frames, said system comprising:

a subset of information service subscribing receivers of said population of receivers;

said transmitting terminal for also transmitting in a transmission period a first information service call address in each of the assigned frames of said subset of receivers, and, when said first information service call address has been transmitted in all of the assigned frames of said receivers of said subset, for transmitting, in the same transmission period, a second information service call address in a frame common to all receivers of said subset followed by an associated information service data message in subsequent frames; and each receiver of said subset being programmed to search for the first information service call address solely in its assigned frame of each transmission batch and, responsive to the reception of the first information service call address in said assigned frame, to search for the second information service call address solely in said common frame, each receiver of said subset further responsive to the reception of the second information service call address in said common frame to receive the associated information service data message in frames subsequent thereto.

15. The system according to claim 14 including means for receiving call information transmitted from the transmitting terminal to determine the event of a transmission period when the first information service call address has been transmitted in all of the assigned frames of the receivers of the subset and for alerting the transmitting terminal of such event.

16. The system according to claim 15 wherein said receiving means is disposed remotely from the transmitting terminal to receive the transmitted call information thereof in a similar manner as that of the subset of receivers.

17. The system in accordance with claim 14 wherein the transmitting terminal is operative to transmit the second information service call address in a common frame within a fixed time interval referenced to each transmission of the first information service call address; and wherein a receiver of said subset is precluded from searching for the second information service call address in the common frame if said second information service call address is not received within the fixed time interval from reception of the associated first information service call address by the corresponding receiver.

18. The system in accordance with claim 14 wherein the transmitting terminal is operative to transmit the second information service call address in a common frame within a predetermined number of synchronization codes referenced to each transmission of the first information service call address; and wherein a receiver of said subset is precluded from searching for the second information service call address in the common frame if it is not received within the predetermined number of synchronization codes from reception of the associated first information service call address by the corresponding receiver.

19. The system in accordance with claim 14 wherein the transmitting terminal is operative to transmit a data word, representative of a variable time interval, in at least one frame subsequent each transmission frame of the first information service call address; wherein each receiver of the subset is responsive to the reception of the first information service call address to receive said variable time interval data word; and wherein a receiver of the subset is precluded from searching for the second information service call address in the common frame if it is not received within the variable time interval of the data word corresponding to the associated first information call address from the reception of the associated first information call address by the corresponding receiver.

20. A transmitting terminal for use in a system for selective radio communication of call information to a population of selectively addressable receivers, said transmitting terminal being operative to transmit said information periodically in transmission periods comprising a plurality of batches, each batch commencing with a predetermined synchronization code followed by a predetermined plurality of sequential frames which may include an individual selective call address of a receiver followed by an individual or group data message for said addressed receiver, each receiver being assigned one frame of each transmission batch, said transmitting terminal comprising:

first means for transmitting in a transmission period a first information service call address in each of the assigned frames of a subset of information service subscribing receivers of said population; and second means for transmitting, in the same transmission period, when said first information service address has been transmitted in all of the assigned frames of said receivers of said subset, a second information service call address in a frame common to all receivers of said subset followed by an associated information service data message in subsequent frames.

21. The transmitting terminal in accordance to claim 20 wherein the second transmitting means is operative to transmit the second information service call address in a common frame within a fixed time interval referenced to each transmission of the first information service call address.

22. The transmitting terminal in accordance with claim 20 wherein the second transmitting means is operative to transmit the second information service call address in a common frame within a predetermined number of synchronization codes referenced to each transmission of the first information service call address.

23. The transmitting terminal in accordance with claim 20 wherein the second transmitting means is operative to transmit a data word, representative of a variable time interval, in at least one frame subsequent each transmission frame of the first information service call address.

24. A receiver for use in a system for selective radio communication of call information from a transmitting terminal to a population of selectively addressable receivers, said transmitting terminal being operative to transmit said information periodically in transmission periods comprising a plurality of batches, each commencing with a predetermined synchronization code followed by a predetermined plurality of sequential frames which may include an individual selective call address of a receiver followed by an individual or group data message for said addressed receiver, each receiver being assigned one frame of each transmission batch, said transmitting terminal further operative to transmit in a transmission period a first information service call address in each of the assigned frames of a subset of information service subscribing receivers of said population, and when said information service call address has been transmitted in all of the assigned frames of said receivers of said subset, to transmit a second information service call address in a frame common to all receivers of said subset followed by an associated information service data message in subsequent frames, said receiver operative to search for its individual selective call address solely in said assigned frame in each transmission batch and, when addressed thereby, to receive the associated data message in subsequent frames, said receiver comprising:
   first means programmably set to enable said receiver to search for the first information service call address solely in the assigned frame of each transmission batch;
   second means responsive to the reception of the first information service call address in said assigned frame to search for the second information call address solely in said common frame; and
   third means responsive to the reception of the second information service call address in said common frame to receive the associated information service data message in frames subsequent thereto.

25. The receiver in accordance with claim 24 wherein the transmitting terminal is operative to transmit the second information service call address in a common frame within a fixed time interval referenced to each transmission of the first information service call address; and wherein said receiver is programmably set to preclude the searching for the second information service call address in the common frame if it is not received within the fixed time interval from reception of the associated first information service call address thereby.

26. The receiver in accordance with claim 24 wherein the transmitting terminal is operative to transmit the second information service call address in a common frame within a predetermined number of synchronization codes referenced to each transmission of the first information service call address; and wherein said receiver is programmably set to preclude the searching for the second information service call address in the common frame if it is not received within the predetermined number of synchronization codes from reception of the associated first information service call address thereby.

27. The receiver in accordance with claim 24 wherein the transmitting terminal is operative to transmit a data word, representative of a variable time interval, in at least one frame subsequent each transmission frame of the first information service call address; wherein said receiver is programmably set to be responsive to the reception of the first information service call address to receive said variable time interval data word, and further to be precluded from searching for the second information service call address in the common frame if it is not received within the variable time interval of the data word corresponding, to the associated first information call address from the reception of the associated first information call address thereby.

28. A system for selective radio communication of call information from a transmitting terminal to a population of selectively addressable receivers, said transmitting terminal being operative to transmit said information periodically in transmission periods comprising a plurality of batches, each batch commencing with a predetermined synchronization code followed by a predetermined plurality of sequential frames which may include an individual selective call address of a receiver followed by an individual or group data message for said addressed receiver, each receiver being assigned one frame of each transmission batch, and operative to search for its individual selective call address in said assigned frame in each transmission batch and, when addressed, to receive the associated data message in subsequent frames, said system comprising:
   a subset of information service subscribing receivers of said population of receivers;
   said transmitting terminal for also transmitting in a transmission period an information service call address in each of the assigned frames of said subset of receivers, each information service call address transmission followed by a corresponding data word, representative of a subsequent frame in said transmission period commencing the transmission of an associated information service data message, and for transmitting in the same transmission period said associated information service data message commencing at the frame represented by said corresponding data word; and
   each receiver of said subset being programmed to search for said information service call address solely in its assigned frame of each transmission batch and, responsive to the reception of said information service call address in said assigned frame to receive said corresponding data word, each receiver of said subset further responsive to the reception of said information service call address to receive the associated information service data message commencing in the frame identified by the corresponding received data word.

29. A transmitting terminal for use in a system for selective radio communication of call information to a population of selectively addressable receivers, said transmitting terminal being operative to transmit said information periodically in transmission periods comprising a plurality of batches, each batch commencing with a predetermined synchronization code followed by a predetermined plurality of sequential frames which may include an individual selective call address of a receiver followed by an individual or group data message for said addressed receiver, each receiver being assigned one frame of each transmission batch, said transmitting terminal comprising:

means for transmitting in a transmission period an information service call address in each of the assigned frames of a subset of information service subscribing receivers of said population, each information service call address transmission followed by a corresponding data word representative of a subsequent frame in said transmission period commencing the transmission of an associated information service data message; and means for transmitting in the same transmission period said associated information service data message commencing at the frame, represented by said corresponding data word.

30. A receiver for use in a system for selective radio communication of call information from a transmitting terminal to a population of selectively addressable receivers, said transmitting terminal being operative to transmit said information periodically in transmission periods comprising a plurality of batches, each commencing with a predetermined synchronization code followed by a predetermined plurality of sequential frames which may include an individual selective call address of a receiver followed by an individual or group data message for said addressed receiver, each receiver being assigned one frame of each transmission batch, said transmitting means further operative to transmit in a transmission period an information service call address in each of the assigned frames of a subset of information service subscribing receivers of said population, each information service call address transmission followed by a corresponding data word, representative of a subsequent frame in said transmission period commencing the transmission of an associated information service data message, and said transmitting terminal still further operative to transmit in the same transmission period the associated information service data message commencing at the frame represented by said corresponding data word, said receiver operative to search for its individual selective call address in said assigned frame in each transmission batch and, when addressed thereby, to receive the associated data message in subsequent frames, said receiver comprising:

first means programmably set to enable said receiver to search for said information service call address solely in its assigned frame of each transmission batch and, responsive to the reception of said information service call address in said assigned frame, to receive said corresponding data word; and second means responsive to the reception of said information service call address to receive the associated information service data message commencing in the frame identified by the corresponding received data word.

31. A system for selective radio communication of call information from a transmitting terminal to a population of selectively addressable receivers, said transmitting terminal being operative to transmit said information periodically in transmission periods comprising a plurality of batches, each batch commencing with a predetermined synchronization code followed by a predetermined plurality of sequential frames which may include an individual selective call address of a receiver followed by an individual or group data message for said addressed receiver, each receiver being assigned one frame of each transmission batch, and operative to search for its individual selective call address in said assigned frame in each transmission batch and, when addressed, to receive the associated data message in subsequent frames, said system comprising:

a subset of information service subscribing receivers of said population of receivers;

said transmitting terminal for also transmitting in a transmission period an information service call address in each of the assigned frames of said subset of receivers, and for transmitting in the same transmission period an associated information service data message commencing at a common frame for all receivers of said subset, said common frame occurring at a fixed differential time relative to each transmission of an information service call address in said transmission period; and each receiver of said subset being programmed to search for said information service call address solely in its assigned frame of each transmission batch and, responsive to the reception of said information service call address in said assigned frame to delay for the corresponding fixed differential time relative to the information service call address reception frame of the corresponding receiver to receive the information service data message commencing at the common frame.

32. A transmitting terminal for use in a system for selective radio communication of call information to a population of selectively addressable receivers, said transmitting terminal being operative to transmit said information periodically in transmission periods comprising a plurality of batches, each batch commencing with a predetermined synchronization code followed by a predetermined plurality of sequential frames which may include an individual selective call address of a receiver followed by an individual or group data message for said addressed receiver, each receiver being assigned one frame of each transmission batch, said transmitting means comprising:

means for transmitting in a transmission period a first information service call address in each of the assigned frames of a subset of information service subscribing receivers of said population; and means for transmitting in the same transmission period an associated information service data message commencing at a common frame for all receivers of said subset, said common frame occurring at a fixed differential time relative to each transmission of an information service call address in said transmission period.

33. A receiver for use in a system for selective radio communication of call information from a transmitting terminal to a population of selectively addressable receivers, said transmitting terminal being operative to transmit said information periodically in transmission periods comprising a plurality of batches, each commencing with a predetermined synchronization code followed by a predetermined plurality of sequential frames which may include an individual selective call address of a receiver followed by an individual or group data message for said addressed receiver, each receiver being assigned one frame of each transmission batch, said transmitting terminal further operative to transmit in a transmission period an information service call address in each of the assigned frames of a subset of information service subscribing receivers of said population, and said transmitting terminal still further operative to transmit in the same transmission period an associated information service data message commencing at a common frame for all receivers of said subset, said common frame occurring at a fixed differential time relative to each transmission of an information service call address in said transmission period, said receiver operative, upon recognition of a received synchronization code, to search for its individual selective call address solely in said assigned frame in the batch corresponding to said received synchronization code and, when addressed thereby, to receive the associated data message in subsequent frames, said receiver comprising:

first means programmably set to enable said receiver to search for said information service call address solely in its assigned frame of each transmission batch; and second means responsive to the reception of said information service call address to delay for the corresponding fixed differential time relative to the information service call address reception frame of said receiver to receive the information service data message commencing at the common frame.

* * * * *